F. V. SIMPSON.

BOX FORMING AND SEALING TRAY.

APPLICATION FILED SEPT. 23, 1915.

Reissued Dec. 14, 1915. 14,033.

Inventor
Frost V. Simpson
by Wm H Zabel
Atty.

UNITED STATES PATENT OFFICE.

FROST V. SIMPSON, OF MILWAUKEE, WISCONSIN, ASSIGNOR TO KIECKHEFER BOX COMPANY, OF MILWAUKEE, WISCONSIN, A CORPORATION OF WISCONSIN.

BOX FORMING AND SEALING TRAY.

14,033. Specification of Reissued Letters Patent. Reissued Dec. 14, 1915.

Original No. 1,146,357, dated July 13, 1915, Serial No. 876,406. Application for reissue filed September 23, 1915. Serial No. 52,309.

*To all whom it may concern:*

Be it known that I, FROST V. SIMPSON, a citizen of the United States, and resident of Milwaukee, in the county of Milwaukee and State of Wisconsin, have invented new and useful Improvements in Box Forming and Sealing Trays, of which the following is a description, reference being had to the accompanying drawings, which are a part of this specification.

This invention has for its object to provide a trap for use in sealing fiber boxes and the like, to properly abut the meeting edges of the folds or otherwise square the said folds of the box and to hold the box flaps in their proper relation after the adhesive has been applied thereto and to assist in inverting the box so as to rest the weight of the contents upon the sealing flaps while the adhesive is setting.

With the above and other objects in view the invention consists in the box forming and sealing tray as herein claimed and all equivalents.

Figure 1:
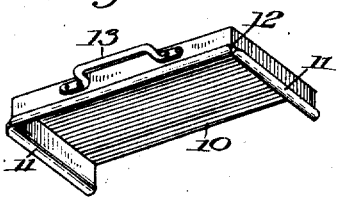
Figure 2:
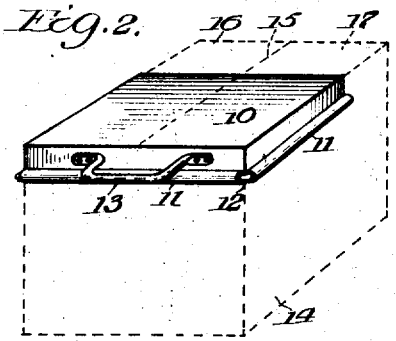
Figure 3:
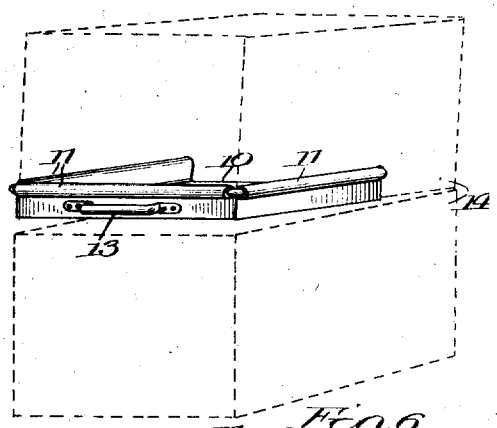
Figure 4:
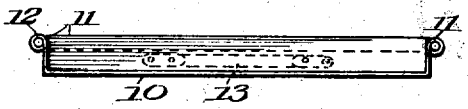
Figure 5:
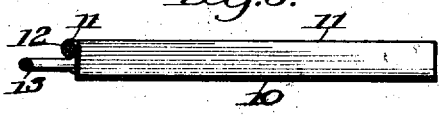
Figure 6:
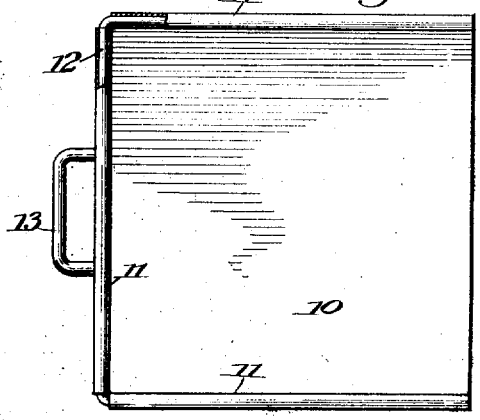

Referring to the accompanying drawings in which like characters of reference indicate the same parts in different views, Figure 1 is a perspective view of a box forming and sealing tray constructed in accordance with this invention; Fig. 2 is a similar view thereof as applied to the box; Fig. 3 is a similar view thereof after inverting the box and in position for removal from beneath the box; Fig. 4 is an end view thereof; Fig. 5 is a longitudinal sectional view thereof; and Fig. 6 is a plan view thereof.

In these drawings 10 indicates a rectangular tray having side flanges 11 along three edges thereof and extending at right angles thereto, the fourth edge of the tray having no flange. The edges of the flanges 11 are stiffened and straightened by being turned around a U shaped rod 12 while the middle flange carries a handle 13.

In use a fiber or similar material box 14 of such dimensions as to exactly fit within the flanges of the tray but extending about one third its length beyond the unflanged edge of the tray is packed with the contents to be shipped therein and after the sealing flaps of said box have had an adhesive applied thereto and are folded together the tray of this invention is placed thereon, the two side flanges of the tray serving to shape the folds and corners of the box. As soon as the tray is fitted in place on the box the handle 13 is grasped with one hand while the bottom of the box is engaged by the other hand and the box is inverted and gently lowered into position on the floor or onto other boxes, as shown in Fig. 3, the tray still holding the freshly glued flaps in their proper place to maintain the true shape of the box and with the rear edge of the box resting on the floor or other support and the front edge of the box slightly raised the tray is gently drawn out from beneath the box without disturbing the shape of the box and the box is allowed to settle in place and remain at rest until the adhesive has set.

By means of this invention the sealing of boxes is greatly facilitated enabling the work to be done quickly and shaping the box to its true rectangular form. The tray not being required to remain in place while the glue is setting is available for use with the next box as soon as it is slipped from beneath the box just sealed and inverted and placed in position for setting the glue.

By referring particularly to Fig. 2 it will be seen the side flanges 11, 11 press the box folds 16 and 17 together so that they properly abut as shown at 15 to secure perfect closure of the box. My device is thus particularly adapted to maintain the abutting edges together during the operation of turning the box over into position where the contents can be relied on to hold the folds in place until the adhesive has set.

What I claim as new and desire to secure by Letters Patent is:

1. A box forming and sealing tray, comprising a rectangular metal tray having flanges projecting from three edges thereof at right angles thereto and adapted to be placed upon the folded glued sealing flaps of a fiber box with its flanges fitting the walls of the box to shape the same and permit the box to be inverted to bring the weight of the contents on the sealing flaps thus positioned while the tray is drawn from beneath the box.

2. A tray for forming the sealing packed fiber boxes, comprising a rectangular tray member of the width of the box and approximately two thirds of the length of the box, flanges projecting from three edges of the tray member at right angles thereto to fit against the walls of the box and form them to a true rectangular shape while the sealing flaps of the box are freshly glued and folded, a U shaped rod around which the edges of the flanges are turned for holding the flanges rigid, and a handle on the end flange of the tray by means of which the tray may assist in inverting the box to bring the weight of the contents onto the sealing flaps, said handle also serving as a means for drawing the tray from beneath the box.

3. A box forming and sealing tray, comprising a rectangular tray having flanges projecting from three edges thereof at right angles thereto and adapted to be placed upon the folded glued sealing flaps of a box with its flanges fitting the walls of the box to shape the same and permit the box to be inverted to bring the weight of the contents on the sealing flaps thus positioned while the tray is drawn from beneath the box.

4. A box forming and sealing tray, comprising a flat base, a handle at one end thereof, and side flanges extending upwardly from said base, adapted to be placed upon the folded abutting sealing flaps of a box to thereby hold said flaps in said abutting position whereby to permit the box to be inverted and bring the weight of the contents on the sealing flaps thus positioned while the tray is drawn from beneath the box.

5. A box forming and sealing tray, comprising a flat base, a handle at one end thereof, and side flanges extending upwardly from said base, adapted to be placed upon the folded sealing flaps of a box to thereby hold said flaps in said position whereby to permit the box to be inverted and bring the weight of the contents on the sealing flaps thus positioned while the tray is drawn from beneath the box.

In testimony whereof I hereunto subscribe my name this 27 day of August, 1915.

FROST V. SIMPSON.

Witnesses:
H. E. BUECHLER,
E. L. WALKER.